US012558711B2

(12) United States Patent
Johnston et al.

(10) Patent No.: US 12,558,711 B2
(45) Date of Patent: Feb. 24, 2026

(54) APPARATUS AND METHOD FOR AUTOMATED INSPECTION OF MOLDED PULP AND OTHER BATCH-PRODUCED PRODUCTS

(71) Applicant: Motus LLC, Greenville, SC (US)

(72) Inventors: Roger Johnston, Greenville, SC (US);
Matt Job, Greenville, SC (US);
Gregory Bruns, Greenville, SC (US);
Blaine Wallace, Greenville, SC (US)

(73) Assignee: Motus LLC, Greenville, SC (US)

( * ) Notice: Subject to any disclaimer, the term of this patent is extended or adjusted under 35 U.S.C. 154(b) by 0 days.

(21) Appl. No.: 18/596,833

(22) Filed: Mar. 6, 2024

(65) Prior Publication Data

US 2024/0299988 A1     Sep. 12, 2024

Related U.S. Application Data

(60) Provisional application No. 63/450,122, filed on Mar. 6, 2023.

(51) Int. Cl.
*B07C 5/342* (2006.01)
*B07C 5/36* (2006.01)
(Continued)

(52) U.S. Cl.
CPC ............ *B07C 5/3422* (2013.01); *B07C 5/362* (2013.01); *D21G 9/0036* (2013.01); *D21J 3/00* (2013.01);
(Continued)

(58) Field of Classification Search
CPC ....... B07C 5/342; B07C 5/3422; B07C 5/362; B07C 5/368; B07C 2501/0063;
(Continued)

(56) References Cited

U.S. PATENT DOCUMENTS 5,212,656 A     5/1993   Clary et al.
5,978,499 A     11/1999  Tossel et al.
(Continued)

FOREIGN PATENT DOCUMENTS

CN          208197506 U  * 12/2018   ............... B07C 5/34
EP          3985171 A1 *  4/2022   ............... D21J 3/00
(Continued)

OTHER PUBLICATIONS

Ryu; Maeng Ryoul, "An Inspection System for Machine Parts" (English Translation), Apr. 24, 2006, worldwide.espacenet.com (Year: 2006).*
(Continued)

*Primary Examiner* — Molly K Devine
(74) *Attorney, Agent, or Firm* — Thrive IP®; Jeremy M. Stipkala

(57) ABSTRACT

A visual inspection system is integrated within a pulp molding process to identify holes, tears, and discoloration of molded products based upon front- and/or back-lit images captured by one or more cameras that have been calibrated to distinguish, on a pixel-by-pixel basis, the aforementioned defects. The system is configured to simultaneously move and process information about the entire batch of products produced by the press and, optionally, to provide feedback to the original molding process in order to address quality issues.

11 Claims, 2 Drawing Sheets

(51) Int. Cl.
| | |
|---|---|
| *D21G 9/00* | (2006.01) |
| *D21J 3/00* | (2006.01) |
| *G06T 7/00* | (2017.01) |

(52) U.S. Cl.
CPC .... *G06T 7/0004* (2013.01); *B07C 2501/0063* (2013.01); *G06T 2207/30124* (2013.01)

(58) Field of Classification Search
CPC .... B65G 47/91; B65G 47/917; B65G 47/918; G01N 21/90
USPC ......................................................... 209/577
See application file for complete search history.

(56) References Cited

U.S. PATENT DOCUMENTS

| | | | |
|---|---|---|---|
| 7,152,319 B2 | 12/2006 | Chan et al. | |
| 9,757,772 B2 * | 9/2017 | Ackley .............. | G01N 21/8851 209/587 |

| | | | |
|---|---|---|---|
| 9,970,884 B1 * | 5/2018 | Nikitin ................ | H04N 17/002 |
| 11,485,101 B2 | 11/2022 | Widner et al. | |
| 2022/0152903 A1 | 5/2022 | Otsuki et al. | |
| 2022/0242015 A1 * | 8/2022 | Bontrager .............. | B29C 43/56 264/571 |
| 2022/0275586 A1 | 9/2022 | Hsiao et al. | |

FOREIGN PATENT DOCUMENTS

| | | | | |
|---|---|---|---|---|
| JP | 2007315794 A | 12/2007 | | |
| KR | 100573039 B1 * | 4/2006 | .............. | G01B 11/24 |

OTHER PUBLICATIONS

Cheng; Qianwei, "Outer Automated Inspection Sorting Unit of Injection Moulding Product Mould" (English Translation), Dec. 7, 2018, worldwide.espacenet.com (Year: 2018).*
Extended European Search Report for Application 24161892.5, dated Aug. 6, 2024, 9 pgs., European Patent Office, Germany.

* cited by examiner

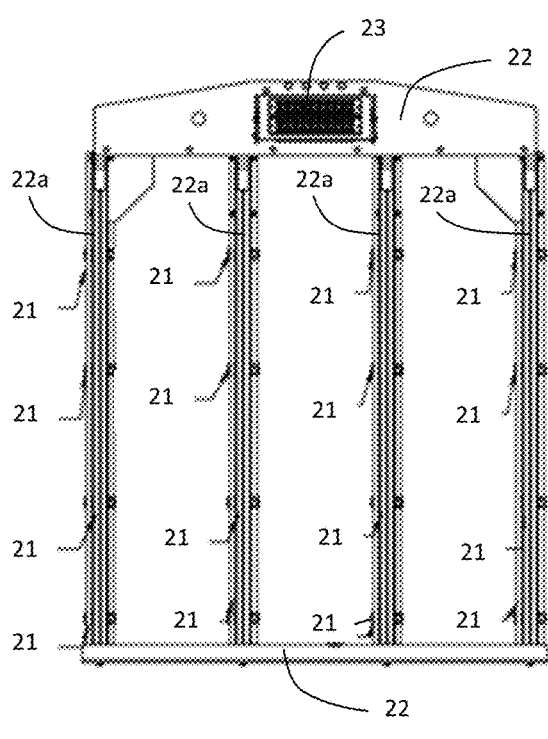
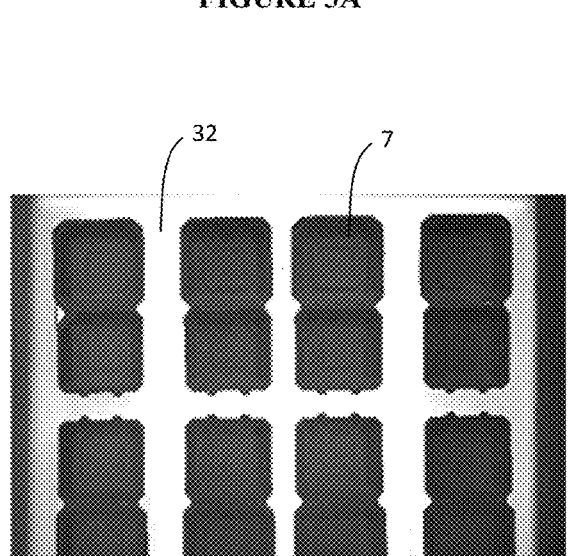
FIGURE 3A
FIGURE 3B
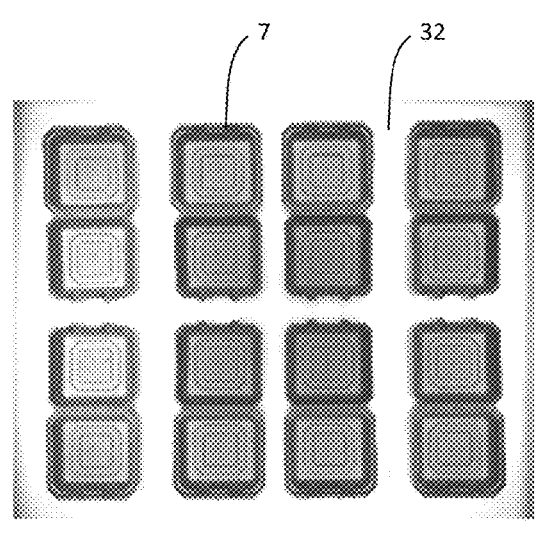
FIGURE 4A
FIGURE 4B

APPARATUS AND METHOD FOR AUTOMATED INSPECTION OF MOLDED PULP AND OTHER BATCH-PRODUCED PRODUCTS

CROSS REFERENCE TO RELATED APPLICATIONS

This application claims priority to U.S. provisional patent application Ser. No. 63/450,122, filed on Mar. 6, 2023, which is incorporated by reference.

TECHNICAL FIELD

The present invention relates to apparatus and methods of performing quality verification on molded pulp products produced on a mass assembly line and, more particularly, to an optical inspection system and method capable of identifying pin holes and other deformities or imperfections in a recently pressed set of molded pulp products.

BACKGROUND

Because of the commoditized nature of paper and pulp products (e.g., plates, bowls, boxes/containers, etc.), manufacturing processes must be as efficient as possible, both in terms of time and energy required to operate the manufacturing line. Consequently, production systems tend to be configured to produce a plurality of products from a single molding press. However, the reliance on fibrous materials can lead to occasional clogs in the production equipment and/or natural variations between products, with pinholes, tears, thinned sections, and unwanted discoloration or non-uniformity being common defects.

At present, molded pulp products are typically inspected for defects by individual human operators. This system is labor-intensive and inconsistent, as different operators may perceive different thresholds for certain types of defects. Further, manual inspections can be a bottleneck in production lines, as it simply is not humanly possible to move as quickly as the remaining line (particularly as presses are configured to produce larger and larger numbers of components from a single molding operation/pressing).

A number of automated inspection systems have been proposed for continuous web production processes. For example, U.S. Pat. No. 11,485,101 discloses a system for controlling the production of corrugated board web. Other, similar continuous web style systems can be found in U.S. Pat. No. 7,152,319.

These continuous process systems are configured to monitor a single output, whereas the industrial presses employed in molded pulp products repeatedly produce a batch of objects on from a regular matrix (usually, anywhere from one or two up to as many as twenty or thirty, depending upon the size of the product and the footprint of the press plates themselves). Thus, solutions for monitoring a single and continuous web may not be practical for direct implementation into existing molded pulp production lines relying on batch-style production methods. Further, even if the molded pulp production line is configured so that the products are eventually arranged into a single line (i.e., the plurality of products are removed from the press and provided to a single conveyor so as to mimic a continuous web), the need to rearrange products removed from the press makes it more difficult to quickly and efficiently identify persistent quality issues that might be associated with one set of tooling on that press (e.g., owing to a partially clogged line).

U.S. Pat. Nos. 5,978,499 and 5,212,656 describe visual inspection systems for box blanks. As above, these systems tend to be configured in a linear manner, with one inspection station integrated into and monitoring the production line at a point well downstream from the original operation where defect-causing errors might occur. Also, these box-oriented systems can be focused on simple questions of dimensional geometry (i.e., will this blank fold into the intended box design) and may not be capable of detecting errors in the feedstock or other visual non-conformities.

All of the aforementioned patent documents are incorporated by reference for background purposes.

In view of the foregoing, an automated system that is capable of integrating into a batch-production manufacturing line is needed, even more preferably at a point where it may be possible to quickly identify and correct root-cause issues. Similarly, a system capable of quickly identifying a single tooling location with a higher error rate would be welcome.

SUMMARY

An optical inspection system may be integrated with a broader molding operation relying upon multiple die sets associated with a single press. A product handling apparatus is configured to remove a batch of finished molded products simultaneously and deliver them to a inspection surface, while retaining record of the arrangement in which the products were positioned on the press. A calibrated vision system then captures backlit and foreground-lit images, which are processed by a controller, with the former providing data regarding possible holes or tears in the molded product and the latter relating to visual or other surface non-conformities. Thereafter, the product handling apparatus returns and transports conforming products to the next operation in the line (e.g., a stacking conveyor). Rejects are left on the inspection surface for further processing to transport to a project reject collection area. The controller may then communicate notification and/or corrective action(s) relating to a specific, recurring problem location on the press.

Further reference should be made to the appended or incorporated information embraced by this disclosure, including any and all claims, drawings, and description. While specific embodiments may be identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 3A is side elevation view and FIG. 3B a top elevation view, both of one aspect of the batch conveyor system of FIG. 1.

FIG. 4A is an exemplary image captured during the backlighting sequence of various aspects of the invention, and FIG. 4B is an exemplary image captured during the foreground sequence of various aspects of the invention.

DETAILED DESCRIPTION

Figure 1:
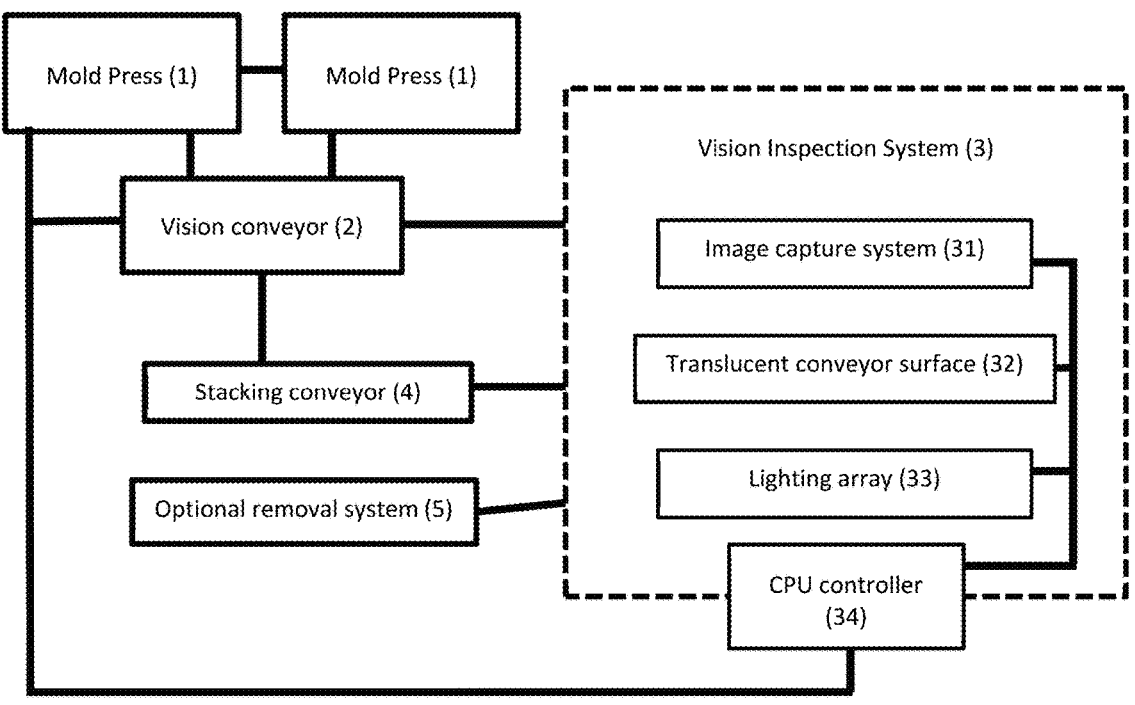
FIG. 1 is a schematic representation of the manufacturing operation and vision inspection system according to certain disclosed aspects.
Figure 2:
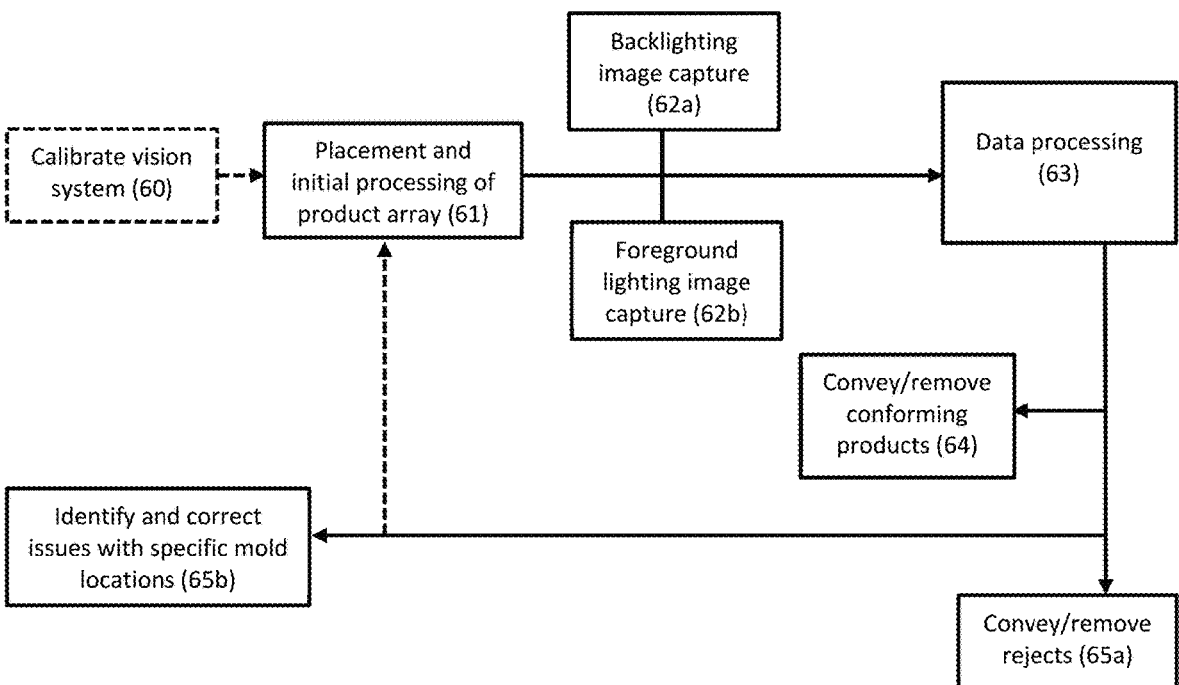
FIG. 2 is a flow diagram illustrating salient steps and actions performed by the system of FIG. 1.

The following description and any reference to the drawings and claims are merely exemplary, and nothing should limit alternatives and modifications that may be possible while adhering to the spirit and scope of the invention. Also, the drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

As used herein, the words "example" and "exemplary" mean an instance or illustration of broader concept; however, use of these words do not necessarily indicate a required, key, or preferred aspect or embodiment. Similarly, the word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise. Approximating language such "about" or "substantially" may be used (or, when consistent with context and reasonable expectations, implied) so as to modify quantitative representations, in which cases the stated value (s)/range(s) may be modified within the reasonable expectations of this art field and not necessarily limited to the precise value specified (unless specifically indicated herein as being precise or critical).

The descriptions and drawings in this disclosure, and any written matter within the drawings should be deemed to be reproduced as part of this specification. Insofar as the tooling described herein deliberately impart shape to the molded pulp products, it will be understood that tool and die may be used synonymously throughout this description. Nevertheless, a person of skill in this field will interpret this description in a manner that is consistent with the state of the art at the time of this invention.

The various aspects of the invention are better understood with reference to the appended drawings. Generally speaking, a two-step vision inspection process is performed on an array of products produced from a single press (or other similar operation). A robot with individually controlled vacuum cups removes the products from the mold and delivers them to an inspection surface, such as a translucent conveyor belt. One image is taken with the products on a backlit conveyor to identify the shape and check for holes or thin spots, and another image is taken with front lighting to identify inclusions or spots on the eating surface of the product. Relying on the individually controlled vacuum cups, the robot then separates conforming and rejected products based upon instructions received from a central processing unit, which processes the captured images on a pixel-by-pixel basis in order to determine defects identified by contrasting pixels within each image. Because the image itself is processed according to the same sequence/array by which the products were removed from the mold and delivered to the inspection surface, it is possible to activate specific suction cups. Also, archival data can be recorded and examined in order to flag and correct persistent quality issues exhibited by discrete locations in the array.

In one implementation, one or series of presses 1 employ tooling plates on which an array of products 7 is molded/formed. Once these products 7 have cooled sufficiently for transport, a batch conveyor 2 simultaneously lifts the entire array of products out of the tooling plate and moves them onto an inspection surface 32.

The batch conveyor 2 can be configured as one or a series of articulating robotic arms 23. A frame 22 extends laterally away from the arm 23, with a plurality of cross members 22a extending across the frame 22. Retrieval implements 21, such as suction cups coupled to a pneumatic control system, extend away from the frame 22 in order to engage the products (either resting on the tooling plate, prior to inspection, or on the inspection surface during/after inspection). A motor coordinates movement of the arm 23 so that images are not obstructed during image capture. Notably, the number of implements 21 should accommodate the number of dies provided on the tooling plate, although the system can be operated effectively even with an excess of implements 21, so long as a group of implements 21 remain consistently associated with a product position on the matrix defined by the frame 22 and its cross members 22a.

The batch conveyor 2 is positioned proximate to the molding press(es) 1, the inspection system 3, and a stacking conveyor 4 and/or reject conveyor 5. Notably, as used herein, conveyor may embody the aforementioned robotic arm and/or more conventional modes of transport, such as moving belts, air trays, roller surfaces, and the like, so long as the mode of transport retains consistency in positioning the matrix of each batch of products. Each conveyor is associated with the products' 7 intended destination, so that the stacking conveyor 4 either stacks the products 7 or delivers them to a separate location where stacking or other processing occurs. The reject conveyor 5 removes the unwanted/non-conforming products 7 from the manufacturing line, with the understanding it may be possible to scrap, recycle, or repurpose/reuse rejected products 7.

The vision inspection system 3 may be built around an appropriate frame. A translucent surface 32 is configured to receive/be accessible to the batch conveyor 2. One or more lights 33, such as dimmable and discretely controllable LED arrays, are positioned above and below surface 32. An image capture system 31 includes at least one camera focused on the surface 32 at the point where the products 7 are initially deposited. Other image capture systems are possible, such as charged coupled device sensors. Further, the translucent surface 32 may itself be configured as a conveyor so that the robot arm 23 will leave conforming or non-conforming products on the surface 32 after inspection, with the conveyor 32 transporting those products to their intended destination (while the robot "picks" the remainder and delivers them to their intended destination). Also, it will be understood that robot arm 23 may include existing, state of the art automated robotic systems, as well as gantry systems, X/Y servo or stepper controlled systems, and the like.

A computer controller 34 is integrated within the vision system 3, although controller 34 may also communicate with and/or control various other elements within the larger system. At a minimum, controller 34 receives, processes, and stores the images created by cameras 31. Notably, this data will be organized and tracked according to the positioning of each retrieval implement 21. In this manner, specific tool/die location performance can be tracked, and appropriate notifications or recommended corrective actions can be issued by the controller 34 itself (without the need for human intervention). As one non-limiting example, if a particular die location consistently produced products with unacceptably thinned or torn wall section, this may be indicative of an obstruction within the pulp delivery connections of that location. In the same manner, a location consistently producing occluded and/or discolored products may require a surface cleaning or other human inspection.

Notably, the controller 34 may also be used to activate suction on discrete implements 21. A further "blow off" system or line may be associated with each of these implements in order to more easily control when products are picked up (e.g., via active suction) or dropped (e.g., via suction cut off and/or activation of the air jet to eject it).

Controller 34 can also include a memory system. As one non-limiting example, the memory system can be paired with data processing techniques (e.g., a predetermined and/or hardwired algorithm, software enabling selection or alteration of criteria, artificial intelligence or other methods not requiring regular human oversight, etc.). In this manner, historical data is stored within the memory and patterns regarding the location, frequency, and nature of rejects can be monitored. In some aspects, the controller 34 may automatically initiate corrective actions, including but not limited to adjustments in the lighting operations, alteration of upstream manufacturing operations (e.g., volume or flow rate of pulp, resident time, temperature, etc.), temporarily disabling problematic locations within the matrix, and providing alerts to maintenance workers, operators, and/or other stakeholders. The memory system can also be used to create and maintain an operational archive that can be reviewed or integrated with other manufacturing or supply chain functions.

Controller 34 may also be configured to adjust lighting conditions in the top or bottom light arrays 33 based upon sensed lighting conditions, time of day, pulp coloration, operator preferences, throughput rate, or other factors. Exemplary lighting conditions include changes to the intensity, dimness, or color of the individual light source(s), and/or additional lights in the array could be switched on or off until the desired level of contrast is achieved.

In a still further aspect, the controller 34 (including any memory or processing functionality) may be configured to temporarily or permanently control and coordinate the pulp molding operation in response to data or images received/recorded by the vision system 3, including changes to the operation the mold press(es) 1, the vision conveyor (2), the stacking conveyor (4), and/or the removal system (5). In this manner, controller 34 may provide a convenient means to monitor, update, reconfigure, or otherwise altering the operation of the various elements associated with vision inspection system 3, as well as providing a useful means to execute the calibration methods described below.

The methodology inherent to this system involves an initial calibration step 60. Here, the operator must determine the size of the array and ensure appropriate focal lengths, shutter speeds, and lighting are provided. The resolution of the camera(s) must also be selected and verified as sufficient to detect the size of expected defects (that is, if 0.5 mm pinholes are deemed as defects, the system must be configured to have sufficient resolution to distinguish product areas of comparable or smaller size). Ultimately, the calibration will be dependent upon the products being inspected, but the overall system 3 components do not need to change.

After calibration, the various elements identified above effectively coordinate three based steps. First, the batch of products must be conveyed in the same arrangement (or in a comparably tracked arrangement) to the image capture system in step 61. Sequential front and back lighting are performed, respectively in steps 62*b* and 62*a*, so as to provide a comprehensive quality check for holes, thinned sections, and visual imperfections or surface defects.

Data captured in these images is processed in step 63 and then at least two—and possibly as many as four—subsequent steps occurs. First, the controller determines which products are conforming and coordinates their conveyance to appropriate portions of the manufacturing line in step 64. Similarly, rejected or non-conforming products are removed in steps 65*a* and/or 65*b*. As further option, data collected over time can be reviewed to determine persistent problems (e.g., rejects) at specific locations in the array, with corrective action recommended or automatically taken by the system. In this latter scenario, the controller is integrated with the molding operations. However, even one-time or initial issues detected in the data can trigger corrective actions (that is, an archive of data is not necessarily required). Finally, it should be noted that the system then resets and repeats this sequence, with the cycle time preferably synchronized with the molding operation itself.

In one aspect, the invention is an inspection system that may integrated directly into existing pulp molding operations. The system includes a batch conveyor having a plurality of product retrieval implements; a translucent inspection surface having separate light sources positioned above and below the surface; an image capture system focused on the inspection surface; and a processor configured to: i) receive images from the image capture system, ii) record data specific to each retrieval implement, and ii) coordinate the selective removal and transportation of conforming and non-conforming products based upon a specific retrieval implement. Additional aspects may include any one or combination of the following:

one or more molding presses and wherein the processor communicates instructions to the molding presses based upon the recorded data;

wherein the inspection surface includes an inspected product conveyor that, in combination with the batch conveyor, moves conforming or non-conforming products to a stack conveyor or reject disposal conveyor, respectively speaking;

wherein the image capture system sequentially captures back-lit and foreground-lit images and delivers the back-lit and foreground-lit images to the processor in a manner that produces data specific to a given retrieval implement;

wherein the image capture system comprises an array of cameras that produce pixelated images and wherein the processor is calibrated to discern defects based upon contrasting pixels within the pixelated images;

wherein the batch conveyor includes a robotic arm fitted with a frame and wherein the retrieval implements are individual suction cups spaced apart on the frame;

7 wherein the processor controls suction of the individual suction cups in order to enable the selective removal of conforming or non-conforming products from the inspection surface.

wherein the processor analyzes the images and/or the record data and changes an operation of at least one light source, the batch conveyor, or the image capture system in response thereto.

wherein the processor analyzes the images and/or the record data and alters the pulp molding operation in response thereto.

Another aspect contemplates a method for inspecting products that are produced simultaneously in a batch process by an array of tooling or dies (which each tool/die produces a discrete product in the batch). This method includes simultaneously removing the products from the array of individual dies; placing the products on a translucent image capture surface in an identical arrangement in which the products were disposed on the array; capturing images of the products on the image capture surface; determining defects in discrete products on the image capture surface; and selectively and simultaneously sorting the products having defect. Additional aspects include initially selecting pixel resolution and positioning a camera at an appropriate distance to capture images having sufficient pixel resolution to represent defects and/or collecting and communicating data regarding performance of specific die locations in the array so as to adjust production parameters of future products.

Still other aspects of the invention are possible. Further reference to the foregoing description and the appended claims, in combination with the background information provided herein, help to elucidate these aspects.

All components of the system should be made of materials having sufficient flexibility and structural integrity, as well as a chemically inert nature. The materials should also be selected for workability, cost, and weight. Tooling made from aluminum and alloys thereof is particularly useful. With respect to the other components, other metals (e.g., various grades of steel, zinc, etc.), alloys of such metals, and/or other composites may be used in place of or in addition to conventional materials. The heating elements can be electrically heated by way of resistive coils and/or ceramic heating elements.

References to coupling are to be understood as encompassing any of the conventional means used in this field. This may take the form of snap- or force fitting of components, although threaded connections, bead-and-groove, "beverage can" and other forms of crimping, and bayonet-style/slot-and-flange assemblies could be employed. Adhesive and fasteners (screws, nut/bolt, etc.) could also be used. All coupling components must be judiciously selected so as to retain the functionality of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Unless otherwise noted, all reported values are in common units accepted in this field, with observations made at ambient temperatures and pressures. Any references to atomic or molecular configurations will be in standard units, with weight averages given preference unless otherwise explicitly stated.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A vision inspection system for a pulp molding operation that is configured to produce an array of products in a single molding press, the system comprising:

a batch conveyor having a plurality of product retrieval implements;

a translucent inspection surface having at least one light source positioned above and at least one light source positioned below the surface;

an image capture system having a single camera or charged coupled device that is focused on the inspection surface so as to capture separate images of the products of the array when the products have been placed on the translucent inspection surface, and both of the light sources above and below the translucent inspection surface are illuminated, wherein the image capture system comprises a selected resolution and is positioned at an appropriate distance from the translucent inspection surface to capture the images with sufficient resolution to represent defects in the products; and a processor configured to: i) receive the images from the image capture system, ii) record data specific to each retrieval implement, and iii) coordinate the selective removal and transportation of conforming and non-conforming products based upon a specific retrieval implement.

2. The system according to claim 1 further comprising one or more molding presses and wherein the processor communicates instructions to the molding presses based upon the recorded data.

3. The system according to claim 1 wherein the inspection surface includes an inspected product conveyor that, in combination with the batch conveyor, moves conforming or non-conforming products to a stack conveyor or reject disposal conveyor, respectively speaking.

4. The system according to claim 1 wherein the image capture system sequentially captures back-lit and foreground-lit images and delivers the back-lit and foreground-lit images to the processor in a manner that produces data specific to a given retrieval implement.

5. The system according to claim 1 wherein the image capture system comprises an array of cameras that produce pixelated images and wherein the processor is calibrated to discern defects based upon contrasting pixels within the pixelated images.

6. The system according to claim 1 wherein the batch conveyor includes a robotic arm fitted with a frame and wherein the retrieval implements are individual suction cups spaced apart on the frame.

7. The system according to claim 6 wherein the processor controls suction of the individual suction cups in order to enable the selective removal of conforming or non-conforming products from the inspection surface.

8. The system according to claim 1 wherein the processor analyzes the images and/or the record data and changes an operation of at least one light source, the batch conveyor, or the image capture system in response thereto.

9. The system according to claim 1 wherein the processor analyzes the images and/or the record data and alters the pulp molding operation in response thereto.

10. A method for inspecting products produced simultaneously by an array of individual dies, the method comprising:

initially selecting a pixel resolution and positioning a single camera or a charged coupled device at an appropriate distance from a translucent image capture surface to capture images having sufficient pixel resolution to represent defects in the products when the products have been placed on the translucent image capture surface;

simultaneously removing the products from the array of individual dies;

placing the products on the translucent image capture surface in an identical arrangement in which the products were disposed on the array;

capturing images of the products on the image capture surface using the single camera or the charged coupled device when separate light sources positioned above and below the translucent image capture surface are illuminated;

determining defects in discrete products on the translucent image capture surface based upon light patterns in the captured images; and selectively and simultaneously sorting the products from the identical arrangement so as to exclude the products having defects.

11. The method according to claim 10 further comprising collecting and communicating data regarding performance of specific die locations in the array so as to adjust production parameters of future products in a manner that reduces defects in future products.

\* \* \* \* \*